(12) United States Patent
Zimmermann

(10) Patent No.: US 7,739,927 B2
(45) Date of Patent: Jun. 22, 2010

(54) ADJUSTING DEVICE FOR POSITIONING A LOAD

(76) Inventor: Juergen Zimmermann, Scheffelstrasse 8, A-6900 Bregenz (AT)

( * ) Notice: Subject to any disclaimer, the term of this patent is extended or adjusted under 35 U.S.C. 154(b) by 595 days.

(21) Appl. No.: 11/753,745

(22) Filed: May 25, 2007

(65) Prior Publication Data

US 2007/0295524 A1 Dec. 27, 2007

(30) Foreign Application Priority Data

May 30, 2006 (AT) ................................. A 927/2006

(51) Int. Cl.
*F16H 27/02* (2006.01)
(52) U.S. Cl. .................... 74/89.36; 74/424.71; 384/129
(58) Field of Classification Search ................ 74/89.23, 74/89.36, 424.71; 384/129, 215
See application file for complete search history.

(56) References Cited

U.S. PATENT DOCUMENTS

| 3,142,998 | A | 8/1964 | Pickles | |
|---|---|---|---|---|
| 5,213,000 | A * | 5/1993 | Saya et al. | .................... 74/425 |
| 7,051,610 | B2 * | 5/2006 | Stoianovici et al. | ........... 74/425 |
| 2003/0167865 | A1 * | 9/2003 | Ishikawa et al. | ........... 74/89.23 |
| 2006/0101931 | A1 | 5/2006 | Zimmermann | |
| 2008/0236312 | A1 * | 10/2008 | Keller et al. | ............... 74/89.23 |

FOREIGN PATENT DOCUMENTS

| AT | 008 083 U1 | 1/2006 |
|---|---|---|
| AT | 008083 | 1/2006 |

\* cited by examiner

*Primary Examiner*—David M Fenstermacher
(74) *Attorney, Agent, or Firm*—Frommer Lawrence & Haug LLP

(57) ABSTRACT

An adjusting device for positioning a load comprises a spindle-type lifting gear, first and second bearing brackets with bearing pins that engage in a respective bearing bush of the gear unit housing for the swivelable bearing support of the gear unit housing of the spindle-type lifting gear, a driving motor with a motor shaft, and a motor flange unit with a flange housing that is rigidly connected to the driving motor on one side and to the gear unit housing on the other side. The flange housing is secured to one of the side surfaces of the gear unit housing at which the bearing bushes of the gear unit housing are arranged. The driveshaft of the spindle-type lifting gear extends parallel to the swiveling axis around which the spindle-type lifting gear is swivelable. The flange housing has, on the side facing the swiveling axis, a recess into which part of the end portion of the arm of the bearing bracket adjacent to the flange housing projects.

15 Claims, 4 Drawing Sheets

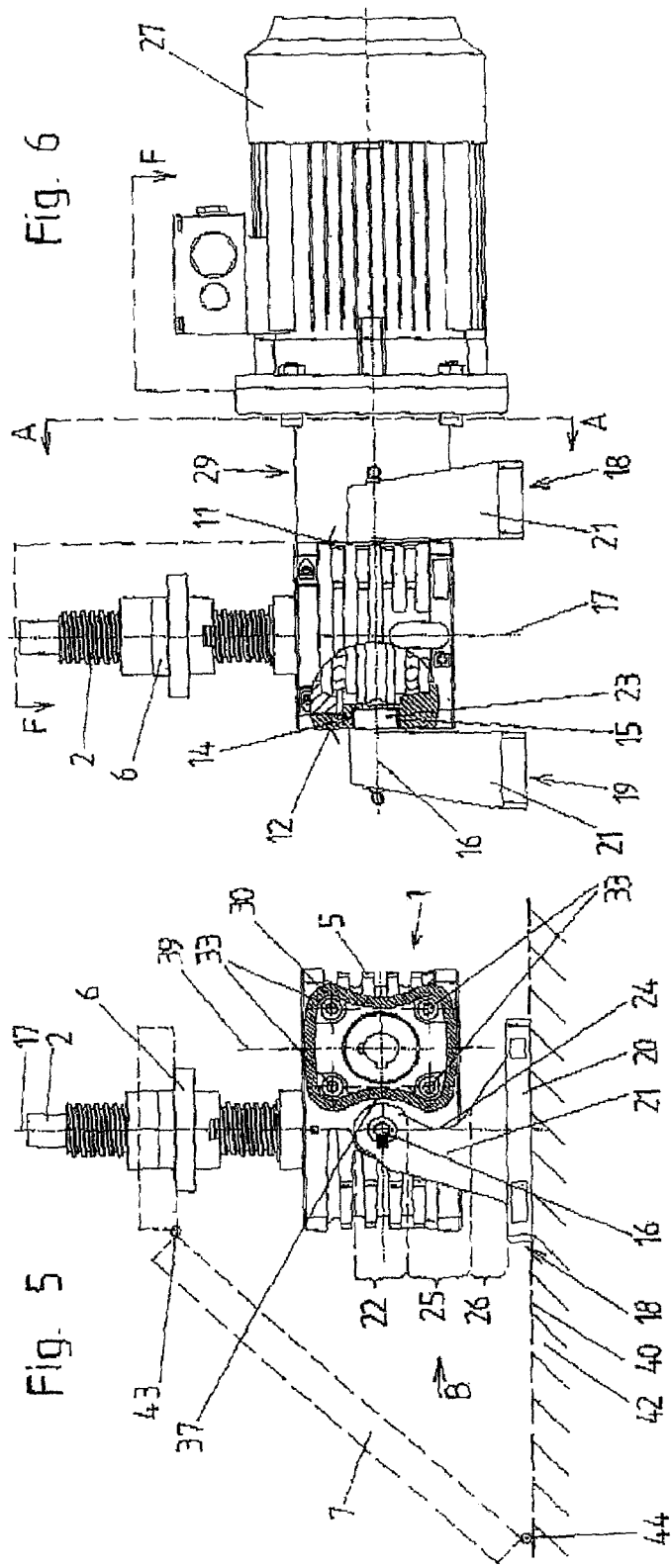

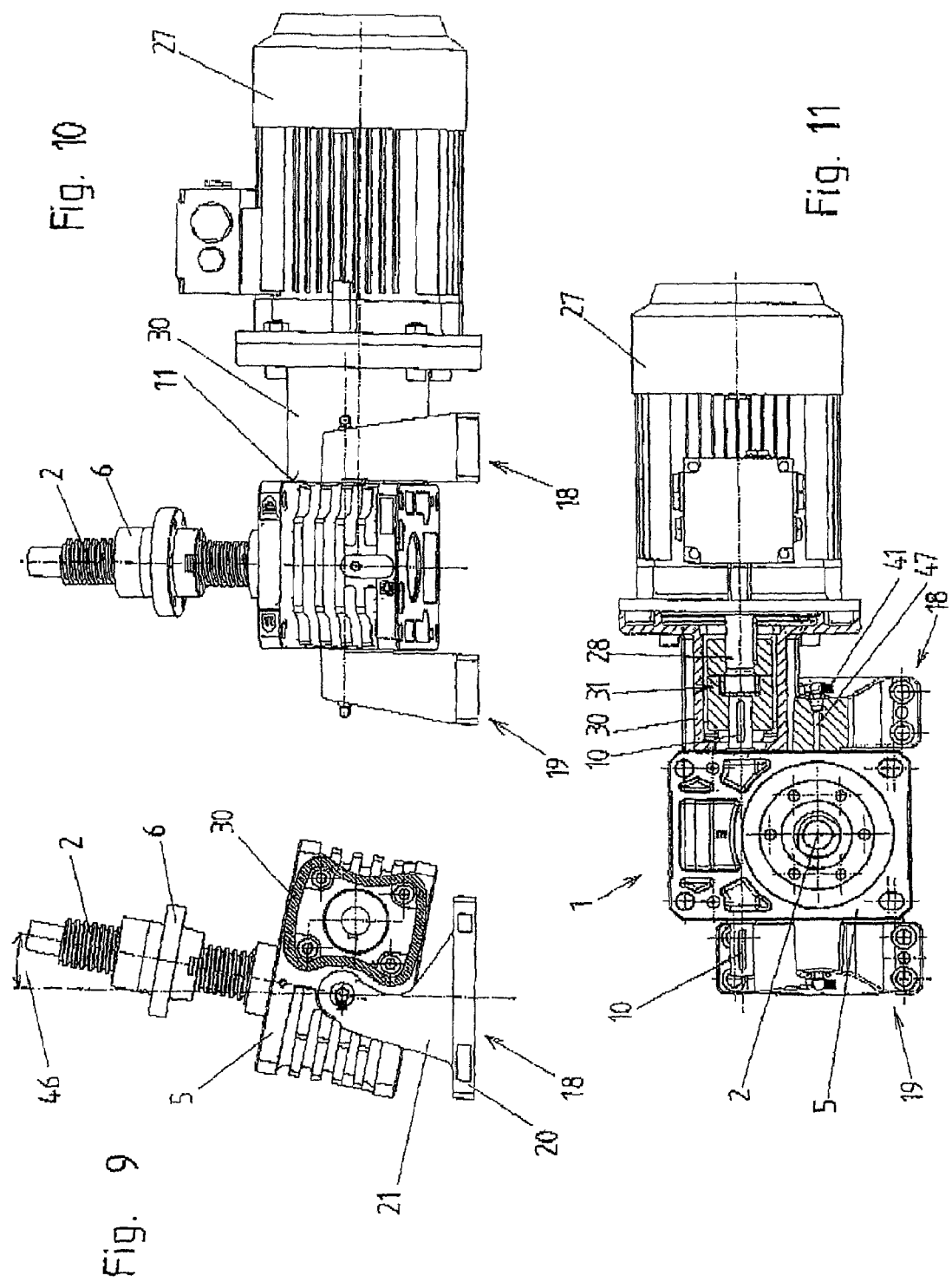

ADJUSTING DEVICE FOR POSITIONING A LOAD

CROSS-REFERENCE TO RELATED APPLICATION

This application claims priority of Austrian Application No. A 927/2006, filed May 30, 2006, the complete disclosure of which is hereby incorporated by reference.

BACKGROUND OF THE INVENTION a) Field of the Invention

The invention is directed to an adjusting device for positioning a load, comprising a spindle-type lifting gear with a spindle, a spindle nut arranged on the spindle, and a gear unit housing having first and second bearing bushes at opposite side surfaces, the spindle or the spindle nut and a driveshaft for driving the spindle or the spindle nut being rotatably supported in the gear unit housing, first and second bearing brackets, each with a stand and an arm which projects therefrom and which has, in an end portion adjoining its free end, a bearing pin that engages in a respective bearing bush of the gear unit housing for the swivelable bearing support of the gear unit housing of the spindle-type lifting gear, a driving motor with a motor shaft, and a motor flange unit with a flange housing that is rigidly connected to the driving motor on one side and to the gear unit housing on the other side, and a coupling arranged in the flange housing for transmitting torque from the motor shaft to the driveshaft of the spindle-type lifting gear.

b) Description of the Related Art

Adjusting devices for positioning a load having spindle-type lifting gears, also called spindle nut gears, are known in various embodiment forms. Adjusting devices of this type are used for positioning loads in the form of structural component parts or component assemblies. For example, these adjusting devices are used in lifting platforms, lifting jacks, vertically adjustable platforms, valves with valve slides that are adjustable by motor, forms for concrete that are adjustable by motor, and so on.

Besides spindle-type lifting gears in which the spindle nut is mounted in bearings in a gear unit housing so as to be rotatable and fixed with respect to axial displacement and in which a spindle which is fixed with respect to relative rotation is adjusted in axial direction during the rotation of the spindle nut, there are also known spindle-type lifting gears in which the spindle is mounted in bearings in the gear unit housing so as to be rotatable and fixed with respect to axial displacement and in which a spindle nut which is arranged on the male thread of the spindle and fixed with respect to rotation is adjusted in axial direction of the spindle during the rotation of the spindle.

The spindle nut or spindle is driven by means of a driving motor whose motor shaft is coupled with a driveshaft projecting out of the gear unit housing of the spindle-type lifting gear. Motor flange units for facilitating the connection of the driving motor and the spindle-type lifting gear are already known. These motor flange units comprise a flange housing and a coupling arranged in the flange housing. The flange housing is fastened to the gear unit housing of the spindle-type lifting gear on one side and to the housing of the driving motor on the other side so that generally it is possible for the driving motor to be held at the gear unit housing so that a separate bearing support of the driving motor can be dispensed with. When connecting the flange housing to the gear unit housing and the motor housing, a connection is produced at the same time between the driveshaft of the spindle-type lifting gear and of the motor shaft of the driving motor and the coupling of the motor flange unit so that the torque-transmitting connection is formed between the motor shaft and the driveshaft.

In applications in which the adjusting device swivels a load around a swiveling axis, the swiveling of the load also brings about a (generally smaller) swiveling of the gear unit housing of the spindle-type lifting gear around a swiveling axis. Adapter pieces are usually provided to enable a swiveling bearing support of the gear unit housing for applications of this type. The gear unit housing can be screwed into these adapter pieces which have bearing bushes or bearing pins. Bearing pins or bearing bushes of bearing brackets arranged at a stationary carrying part, for example, a supporting table, cooperate with these bearing bushes or bearing pins of the adapter pieces, and the load is swiveled around a swiveling axis relative to this carrying part. Further, the load is swivelably connected to the spindle (in case of an axially adjustable spindle) or to the spindle nut (in case of an axially adjustable spindle nut). A swivelable bearing support of the adapter pieces connected to the gear unit housing at the swivelable load and a swivelable bearing support of the axially adjustable spindle or axially adjustable spindle nut at a stationary carrying part, for example, a supporting table, can also be provided. The additional adapter pieces lead to additional expenditure in production and assembly.

Another adjusting device of the type mentioned above is known from AT 008 083 U1 which shows and describes the spindle-type lifting gear and bearing brackets of this device. The bearing bushes for the swivelable bearing support of the spindle-type lifting gear are arranged directly in the gear unit housing in this device, and pocket holes in which sliding bushes are inserted are formed at opposite side surfaces of the gear unit housing. The bearing pins of bearing brackets project into these bearings bushes for the swivelable bearing support of the gear unit housing. The bearing pins are arranged at arms which project from the stands and which are formed in the shape of an inverted V.

For reasons of space (because a compact construction of the gear unit housing of the spindle-type lifting gear is desirable), the bearing bushes and the driveshaft in this previously known adjusting device of the type mentioned above are arranged at side surfaces of the gear unit housing which extend at right angles to one another, i.e., the swiveling axis and the axis of the driveshaft are at right angles to one another. When the driving motor is arranged at the gear unit housing by means of a motor flange unit, the weight of the driving motor can lead to an undesirably high torque around the swiveling axis of the gear unit housing depending on the position of the gear unit housing.

OBJECT AND SUMMARY OF THE INVENTION

It is the primary object of the invention to provide an improved adjusting device of the type mentioned in the beginning in which only a relatively small torque acting around the axis of the driveshaft or motor shaft is exerted in all spatial orientations of the gear unit housing by the driving motor connected to the gear unit housing by the motor flange unit.

According to the invention, this object is met by an adjusting device for positioning a load, comprising a spindle-type lifting gear with a spindle, a spindle nut arranged on the spindle, and a gear unit housing having first and second bearing bushes at opposite side surfaces, the spindle or the spindle nut and a driveshaft for driving the spindle or the spindle nut being rotatably supported in the gear unit housing, first and second bearing brackets, each with a stand and an arm which projects therefrom and which has, in an end portion adjoining its free end, a bearing pin that engages in a respective bearing bush of the gear unit housing for the swivelable bearing support of the gear unit housing of the spindle-type lifting gear, a driving motor with a motor shaft, and a motor flange unit with a flange housing that is rigidly connected to the driving motor on one side and to the gear unit housing on the other side, and a coupling arranged in the flange housing for transmitting torque from the motor shaft to the driveshaft of the spindle-type lifting gear, wherein the flange housing is secured to one of the side surfaces of the gear unit housing at which the bearing bushes of the gear unit housing are arranged, and the driveshaft of the spindle-type lifting gear extends parallel to the swiveling axis around which the spindle-type lifting gear is swivelable, and wherein the flange housing has, on the side facing the swiveling axis, a recess into which part of the end portion of the arm of the bearing bracket adjacent to the flange housing projects.

By means of the construction according to the invention, the motor flange unit can be arranged at one of the two side surfaces of the gear unit housing at which the bearing bushes are located even in a compact construction of the gear unit housing, and a stable construction of the flange housing of the motor flange unit and, therefore, also a stable connection of the driving motor to the gear unit housing can be achieved.

At least the arm of that bearing bracket that is arranged adjacent to the flange housing preferably has, on the side facing the flange housing, a recess in a middle portion adjoining its upper end portion, and a portion of the flange housing projects into this recess in a portion of the swiveling area of the gear unit housing. The possible swiveling area of the gear unit housing can be enlarged in this way. In particular, a portion of the flange housing projects into the recess of the arm of the bearing bracket in that swiveling position of the gear unit housing in which the spindle of the spindle-type lifting gear is oriented at right angles to a standing plane of the stands of the bearing brackets.

In an advantageous embodiment form of the invention, the flange housing also has a recess on the side remote of the swiveling axis of the gear unit housing. Due to this "waisted" construction of the flange housing, the same flange housing can be arranged at either side surface of the gear unit housing at which the bearing bushes are arranged. Accordingly, different motor flange units need not be provided for different applications. The flange housing can have a construction which is very stable statically.

Other advantages and details of the invention are described in the following with reference to the accompanying drawings.

BRIEF DESCRIPTION OF THE DRAWINGS

In the drawings:

FIG. 5 shows a section along line A-A of FIG. 6, wherein a stationary carrying part for mounting the adjusting device and a load to be moved are indicated schematically by dashed lines;

FIG. 6 shows a side view of the adjusting device in the same swiveling position as that shown in FIG. 5, the gear unit housing partially in section, viewing direction B in FIG. 5;

FIGS. 7 and 8 show views corresponding to FIG. 5 (without the stationary carrying part and load) and FIG. 6 in another swiveling position of the gear unit housing;

FIGS. 9 and 10 show views corresponding to FIG. 5 and FIG. 6 in another swiveling position of the gear unit housing; and FIG. 11 shows a section along line C-C of FIG. 6.

DESCRIPTION OF THE PREFERRED EMBODIMENT EXAMPLES

Figure 1:
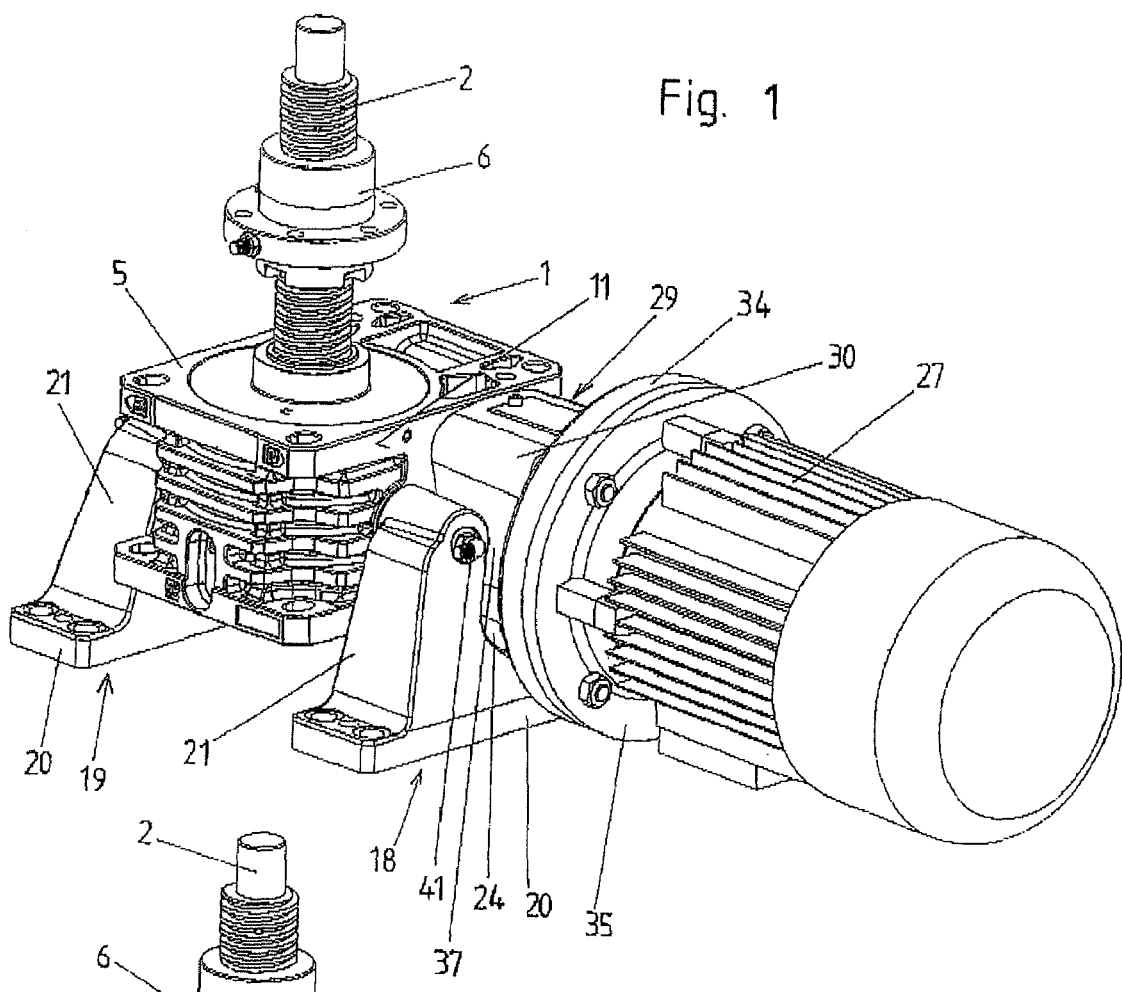
FIG. 1 shows an oblique view of an adjusting device according to the invention.
Figure 2:
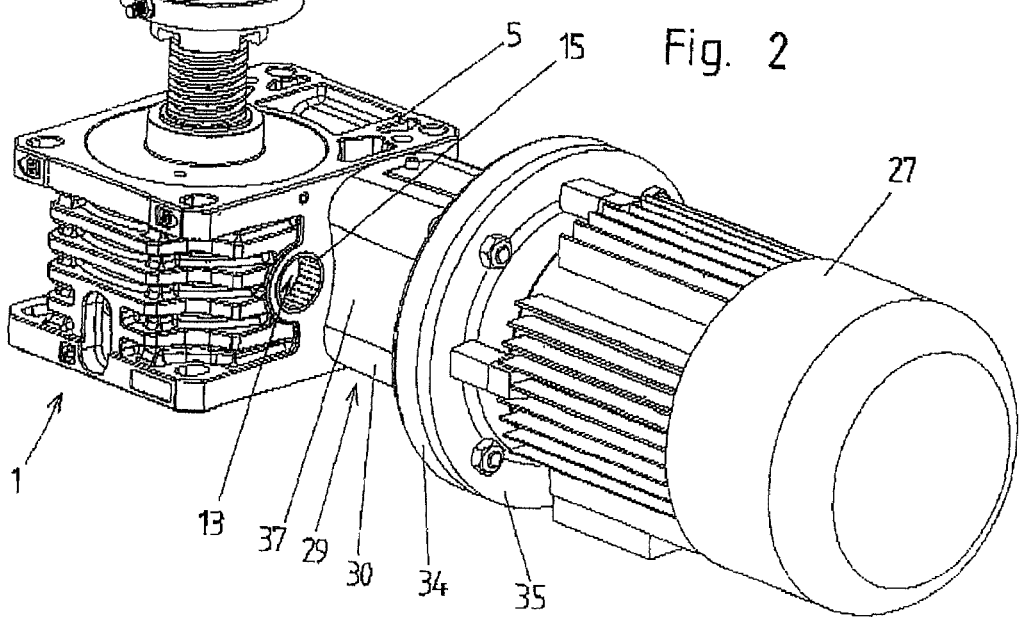
FIG. 2 shows an oblique view corresponding to FIG. 1 without the bearing brackets.

In the embodiment example shown in the drawings, the spindle-type lifting gear 1 has a spindle 2 which is rotatably mounted by means of axial bearings 3, 4 in the gear unit housing 5 so as to be fixed with respect to axial displacement. A spindle nut 6 which is fixed with respect to rotation by its connection to the load 7 to be adjusted (see FIG. 5) is arranged on the male thread of the spindle 2. The spindle nut 6 is displaced in axial direction of the spindle 2 by the rotation of the spindle 2.

A driving gear 9 whose external toothing meshes with the external toothing of a toothed wheel 9 that is rigidly connected to the spindle 2 is rotatably mounted inside the gear unit housing 5 for the rotation of the spindle 2. The external toothing of the toothed wheel 9 can be constructed, for example, as a worm toothing and the driving gear 8 can be constructed as a worm. The driving gear 8 is driven by a driveshaft 10 which exits from and projects out of the gear unit housing 5 at opposite side surfaces 11, 12 of the gear unit housing 5 in the present embodiment example. The rotatable bearing support of the driving gear 8 can be carried out, for example, by a rotatable bearing support of the driveshaft 10 by radial bearings arranged on both sides of the driving gear 8.

Figure 3:
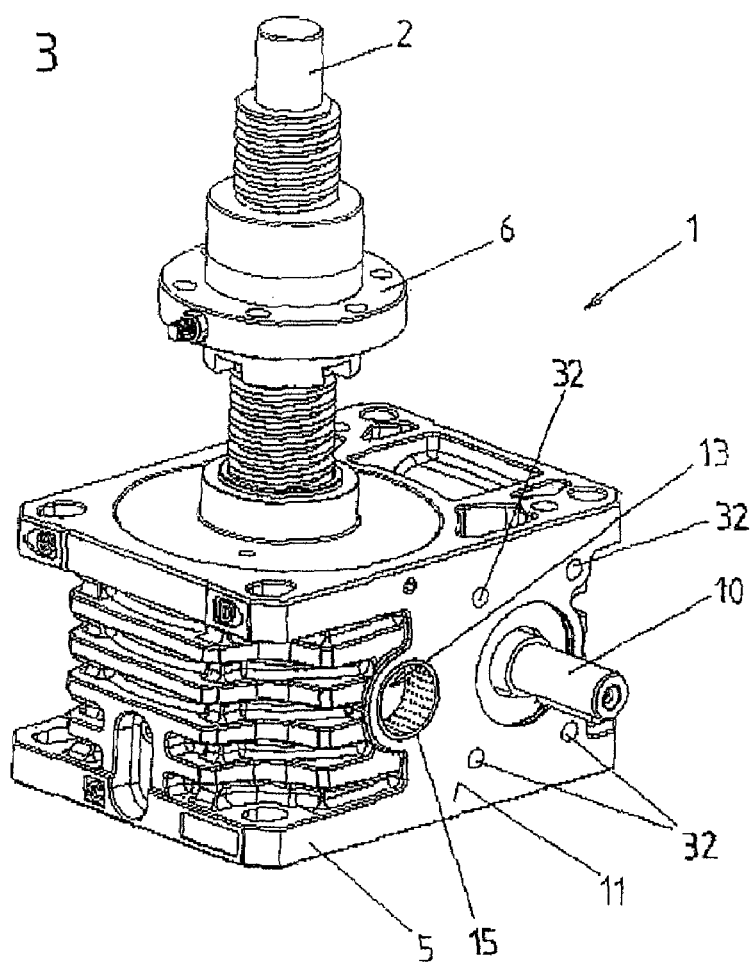
FIG. 3 shows an oblique view of the spindle-type lifting gear only (the adjusting device without the bearing brackets, the driving motor and the motor flange unit)
Figure 4:
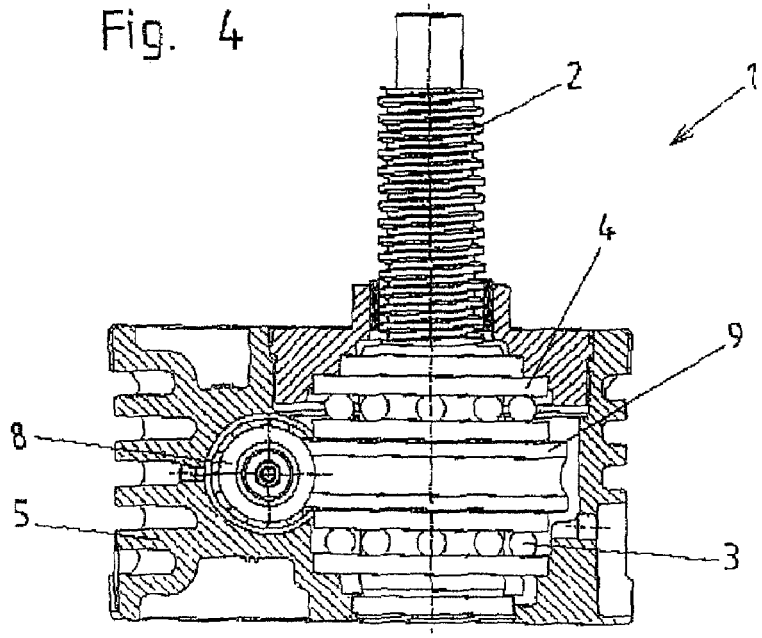
FIG. 4 shows a section through the spindle-type lifting gear parallel to the longitudinal axis and through the longitudinal axis (at right angles to the swiveling axis defined by the bearing bushes)

Further, bearing bushes 13, 14 are arranged (see FIG. 3 and FIG. 6) at the side surfaces 11, 12 of the gear unit housing 5. These bearing bushes 13, 14 are formed by pocket holes which are arranged in the gear unit housing 5 and in which sliding bushes 15 are inserted.

The bearing bushes 13, 14 accordingly lie at the same side surfaces 11, 12 at which the driveshaft 10 projects out of the gear unit housing 5. The bearing bushes 13, 14 are displaced laterally relative to the projecting ends of the driveshaft 10, i.e., are at a distance from the latter. The swiveling axis 16 which is predetermined by the bearing bushes 13, 14 extends at right angles to the longitudinal axis 17 of the spindle 2. The swiveling axis 16 preferably intersects the longitudinal axis 17 of the spindle 2 as can be seen from the drawings.

The driveshaft 10 or its longitudinal axis is oriented parallel to the swiveling axis 16.

Bearing brackets 18, 19 are provided for the swivelable bearing support of the spindle-type lifting gear 1 around the swiveling axis 16. Each of these bearing brackets 18, 19 has a stand 20 and an arm 21 projecting from the latter. In an end portion 22 (see FIG. 5) of the free end of the respective arm 21 remote of the stand 20, the arm 21 has a bearing pin 23 (see FIG. 6). In the assembled state of the adjusting device, the bearing pins 2 of the arms 21 of the bearing brackets 18, 19 engage in the bearing bushes 13, 14 to support the gear unit housing 5 and, therefore, the spindle-type lifting gear 1 together so as to be swivelable around the swiveling axis 16.

The bearing pins 23 are preferably formed integral with the arm 21 of the stand 20. Accordingly, the extension of the end portion 22 can be kept small at right angles to the swiveling axis 16.

Lubricating means 41 are provided at the arms 21 for lubrication. Bore holes 47 (see FIG. 11) proceed from the lubricating means 41 and extend through the arms 21 and bearing pins 23 to their front sides.

On the side facing the driveshaft 10 in the assembled state, the arms 21 have a recess 24 in a middle portion 25 lying between the end portion 22 and a base portion 26 of the arm 21 adjacent to the stand 20, i.e., they are concave in this area (considered from the motor flange unit 29 which will be described below).

A driving motor 27 having a motor shaft 28 serves to drive the adjusting device.

A motor flange unit 29 serves to attach the driving motor 27 to the gear unit housing 5 and to transmit a rotational movement of the motor shaft 28 to the driveshaft 10. This motor flange unit 29 has a coupling 31 inside a flange housing 30.

In order to fasten the flange housing 30 to one of the side surfaces 11, 12 of the gear unit housing 5, threaded bore holes 32 (see FIG. 3) are arranged at these side surfaces 11, 12 in the area around the projecting ends of the driveshaft 10. The flange housing 30 has corresponding bore holes through which fastening screws 33 which are screwed into the threaded bore holes 32 project (see FIG. 5). To fasten the driving motor 27 to the other side of the flange housing 30, the flange housing 30 and the driving motor 27 have annular flanges 34, 35 with corresponding bore holes in order to attach the driving motor 27 to the flange housing 30 by means of screws 36 and nuts which are screwed onto the latter (FIG. 8).

When the flange housing 30 is connected to the gear unit housing 5 and the driving motor 27, the driveshaft 10 and the motor shaft 28 are coupled with the coupling 31 so that the driveshaft 10 is connected to the motor shaft 28 so as to be fixed with respect to rotation relative to it. For this purpose, the coupling 31 has insertion openings to connect it to the driveshaft 10 and to the motor shaft 28 so as to be fixed with respect to rotation relative to them.

The flange housing 30 is provided with a recess 37 at least on the side facing the swiveling axis 16, i.e., it has a concave area considered from the swiveling axis 16. In the assembled state of the adjusting device, part of the end portion 22 of the arm 21 of the adjacent bearing bracket 18, which part faces the flange housing 30, projects into this recess 37 as can be seen particularly from FIGS. 5, 7 and 9.

The flange housing 30 preferably also has a recess 38 on the opposite side, i.e., the side remote of the swiveling axis 16, that is, it has a concave area on this side. Accordingly, the same motor flange unit 29 can be used optionally on one of the two side surfaces 11, 12 of the gear unit housing 5. In the present embodiment example, the flange housing 30 is constructed in a mirror-symmetric manner with respect to a center plane 39 (FIG. 5) extending perpendicular to the plane defined by the driveshaft 10 and the swiveling axis 16 in the assembled state.

The recess 37 lies in the area of the intersecting line of the plane defined by the driveshaft 10 and the swiveling axis 16 intersecting with the flange housing 30. This is also true of the recess 38 that is preferably provided at the other side of the flange housing 30.

The swiveling area of the spindle-type lifting gear 1 is shown in FIGS. 5 to 10. FIGS. 5 and 6 show the swiveling position of the gear unit housing 5 in which the spindle 2 or its longitudinal axis 17 is oriented at right angles to a standing plane 40 of the stands 20 of the bearing brackets 18, 19. In this swiveling position, a portion of the flange housing 30 projects into the recess 24 of the arm 21 of the adjacent bearing bracket 18. This portion of the flange housing 30 lies in the area of the end of the side of the flange housing 30 facing the adjacent bearing bracket 18, which end faces the stand 20.

Starting from this swiveling position of the spindle-type lifting gear 1 shown in FIGS. 5 and 6, the spindle-type lifting gear 1 is swivelable preferably by at least 90° in one direction in which the flange housing 30 is guided out of the recess 24 of the arm 21. In a particularly preferable manner, this angle 45 is at least 100°. In the present embodiment example, this angle 45 is greater than 110° (see FIGS. 7 and 8).

Proceeding from the swiveling position shown in FIGS. 5 and 6, the gear unit housing is preferably swivelable by at least 5° in the direction in which the flange housing 30 progressively engages in the recess 24 of the arm 21. It is particularly preferable when this angle 46 is greater than 10° as in the present embodiment example (see FIGS. 9 and 10).

An example of the adjustment of a load 41 by means of an adjusting device according to the invention is shown only schematically by dashed lines in FIG. 5. The stands 20 of the bearing brackets 18, 19 are secured to a stationary carrying part 42, for example, a supporting table. The load 7 to be adjusted is connected to the spindle nut 6 so as to be swivelable around an axis 43 and is connected to the carrying part 42 so as to be swivelable around an axis 44. The swiveling of the load 7 relative to the carrying part 42 around the axis 44 by means of the axial displacement of the spindle nut 6 on the spindle 2 also causes a swiveling of the gear unit housing 5 around the swiveling axis 16. It would also be conceivable and possible to fasten the load 7 to be adjusted to the bearing brackets 18, 19 and the spindle nut 6 to the stationary carrying part 42.

In the present embodiment example, both arms 21 of the bearing brackets 18, 19 are provided with recesses 24 in order to arrange the flange housing 30 at the two side surfaces 11, 12 while retaining the full swiveling angle. Also, only the arm 21 on the side of the gear unit housing 5 at which the flange housing 30 is mounted could be provided with a recess 24 of this kind. When a small swiveling area is sufficient, the recesses 24 of the two arms 21 could also be dispensed with, although this is less preferable.

The flange housing 30 could also have a recess 37 only on the side facing the adjacent arm 21. In this case, separate flange housings 30 could be provided for use at the two side surfaces 11, 12, although this is less preferable.

The driveshaft 10 could exit from the gear unit housing 5 on only one of the side surfaces 11, 12 so that the driving motor 27 can be connected to the spindle-type lifting gear 1 only at this side, although this is also less preferable. Portions of separate driveshafts 10 could also exit from the gear unit housing 5 at the opposite side surfaces 11, 12.

The spindle-type lifting gear 1 can also be constructed in such a way that the spindle nut is mounted in the gear unit housing 5 so as to be rotatable and fixed with respect to axial displacement and rotated by the rotation of the driveshaft 10. The spindle 2 which is fixed with respect to rotation (by its connection to the load or by known means for locking against rotation) is then displaced in axial direction by the rotation of the spindle nut 6 and accordingly adjusts the load. Spindle-type lifting gears of this kind are known.

As follows from the preceding description, the field of the invention is not limited to the embodiment examples shown herein, but rather should be defined with reference to the appended claims together with the full range of possible equivalents.

While the preceding description and drawings show the invention, it is obvious to the person skilled in the art that various modifications can be carried out without departing from the spirit of and field of the invention.

| Reference Numbers: | |
|---|---|
| 1 | spindle-type lifting gear |
| 2 | spindle |
| 3 | axial bearing |
| 4 | axial bearing |
| 5 | gear unit housing |
| 6 | spindle nut |
| 7 | load |
| 8 | driving gear |
| 9 | toothed wheel |
| 10 | driveshaft |
| 11 | side surface |
| 12 | side surface |
| 13 | bearing bush |
| 14 | bearing bush |
| 15 | sliding bush |
| 16 | swiveling axis |
| 17 | longitudinal axis |
| 18 | bearing bracket |
| 19 | bearing bracket |
| 20 | stand |
| 21 | arm |
| 22 | end portion |
| 23 | bearing pin |
| 24 | recess |
| 25 | middle portion |
| 26 | base portion |
| 27 | driving motor |
| 28 | motor shaft |
| 29 | motor flange unit |
| 30 | flange housing |
| 31 | coupling |
| 32 | threaded bore hole |
| 33 | fastening screw |
| 34 | annular flange |
| 35 | annular flange |
| 36 | screw |
| 37 | recess |
| 38 | recess |
| 39 | center plane |
| 40 | standing plane |
| 41 | lubricating nipple |
| 42 | carrying part |
| 43 | axis |
| 44 | axis |
| 45 | angle |
| 46 | angle |
| 47 | bore hole |

What is claimed is:

1. An adjusting device for positioning a load, comprising:
a spindle-type lifting gear having a spindle, a spindle nut arranged on the spindle, and a gear unit housing having first and second bearing bushes at opposite side surfaces;
said spindle or the spindle nut and a driveshaft for driving the spindle or the spindle nut being rotatably supported in the gear unit housing;
first and second bearing brackets, each with a stand and an arm which projects therefrom and which has, in an end portion adjoining its free end, a bearing pin that engages in a respective bearing bush of the gear unit housing for the swivelable bearing support of the gear unit housing of the spindle-type lifting gear;
a driving motor with a motor shaft;
a motor flange unit with a flange housing that is rigidly connected to the driving motor on one side and to the gear unit housing on the other side; and
a coupling arranged in the flange housing for transmitting torque from the motor shaft to the driveshaft of the spindle-type lifting gear;
said flange housing being secured to one of the side surfaces of the gear unit housing at which the bearing bushes of the gear unit housing are arranged;
said driveshaft of the spindle-type lifting gear extending parallel to the swiveling axis around which the spindle-type lifting gear is swivelable; and
said flange housing having, on the side facing the swiveling axis, a recess into which part of the end portion of the arm of the bearing bracket adjacent to the flange housing projects.

2. The adjusting device according to claim 1, wherein at least the arm of the bearing bracket that is arranged adjacent to the flange housing has, on the side facing the flange housing, a recess in a middle portion adjoining its end portion, and part of the flange housing projects into this recess in a portion of the swiveling area of the gear unit housing.

3. The adjusting device according to claim 2, wherein a portion of the flange housing projects into the recess of the arm in the swiveling position of the gear unit housing in which the spindle is oriented at right angles to a standing plane of the stands of the bearing brackets.

4. The adjusting device according to claim 1, wherein the driveshaft or end portions of two driveshafts project(s) out of the gear unit housing at both side surfaces of the gear unit housing at which the bearing bushes are arranged, and wherein a flange housing of a motor flange unit can be rigidly connected to one of the two side surfaces of the gear unit housing.

5. The adjusting device according to claim 4, wherein the arms of the two bearing brackets have, in a middle portion on the side directed to the driveshaft, a recess for receiving a portion of the flange housing over a portion of the swiveling area of the gear unit housing.

6. The adjusting device according to claim 5, wherein the recesses of the arms of the two bearing brackets face in the same direction.

7. The adjusting device according to claim 1, wherein the flange housing also has a recess on the side remote of the swiveling axis.

8. The adjusting device according to claim 7, wherein the flange housing is constructed in a mirror-symmetric manner with respect to a center plane extending perpendicular to the plane defined by the driveshaft of the spindle-type lifting gear and the swiveling axis of the spindle-type lifting gear.

9. The adjusting device according to claim 1, wherein the bearing pins are formed integral with the arms of the bearing brackets.

10. The adjusting device according to claim 3, wherein the spindle-type lifting gear is swivelable by at least 90° in a direction in which the flange housing is guided out of the recess of the arm starting from the swiveling position of the gear unit housing in which the spindle is oriented perpendicular to the standing plane of the stands of the bearing brackets.

11. The adjusting device according to claim 10, wherein the spindle-type lifting gear is swivelable by at least 100° in the direction in which the flange housing is guided out of the recess of the arm.

12. The adjusting device according to claim 10, wherein the spindle-type lifting gear is swivelable by at least 5° in the opposite direction in which the flange housing progressively engages in the recess of the arm starting from the swiveling position in which the spindle is oriented perpendicular to the standing plane.

13. The adjusting device according to claim 12, wherein the spindle-type lifting gear is swivelable in the opposite direction by at least 10°.

14. The adjusting device according to claim 1, wherein the gear unit housing has threaded bore holes on at least one of its side surfaces at which the driveshaft projects out or the end portions of two driveshafts project out of the gear unit housing, and fastening screws for screwing the flange housing to the gear unit housing can be screwed into these threaded bore holes.

15. The adjusting device according to claim 1, wherein the swiveling axis of the spindle-type gear intersects the longitudinal axis of the spindle.

* * * * *